Nov. 22, 1966  R. J. FRANZ  3,286,922
ELECTRO VACUUM TEMPERATURE CONTROL SYSTEM
Filed April 26, 1965  2 Sheets-Sheet 1
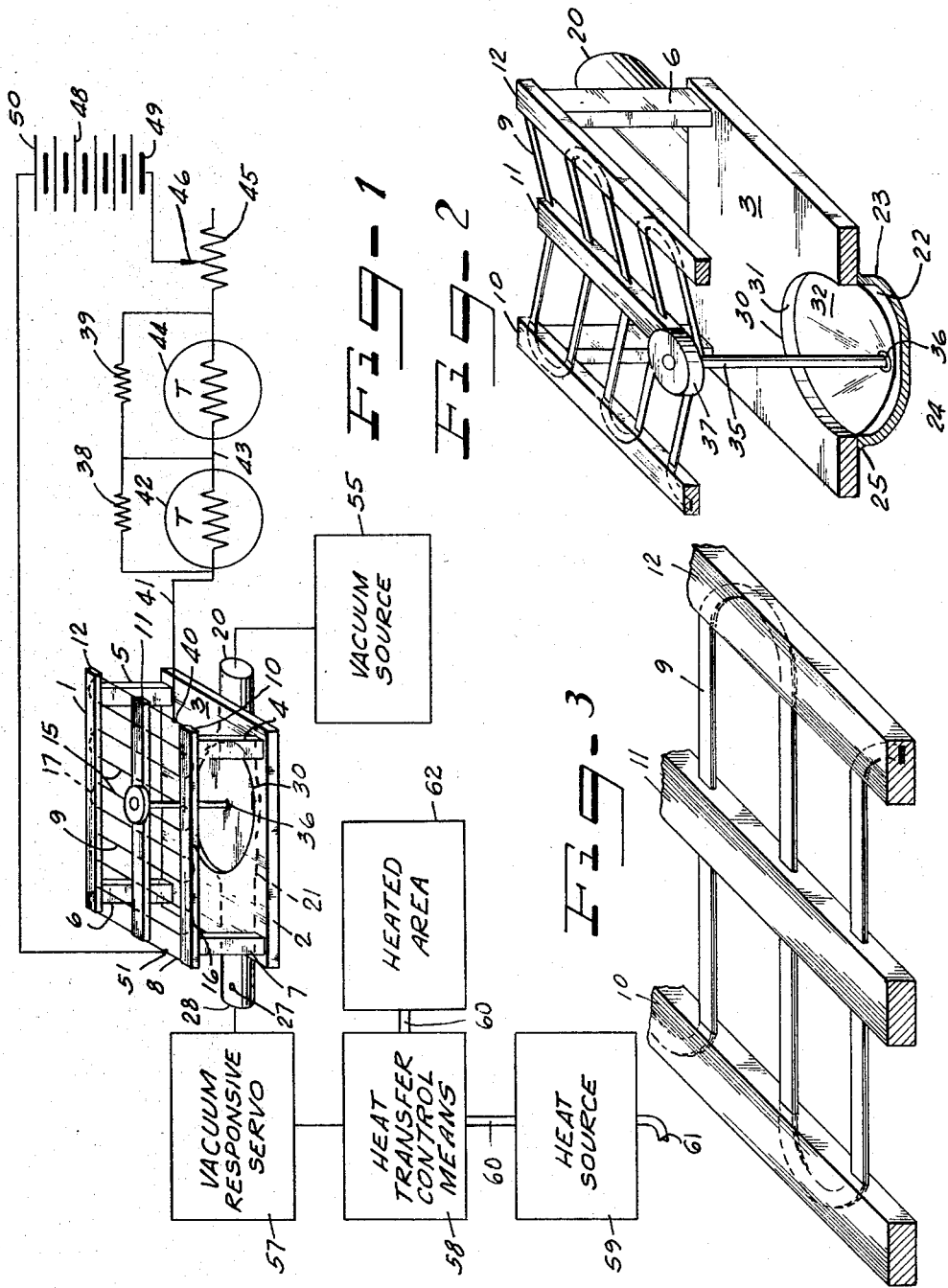
INVENTOR.
RUDOLPH J. FRANZ
BY  Hill, Sherman, Meroni, Gross & Simpson  ATTORNEYS

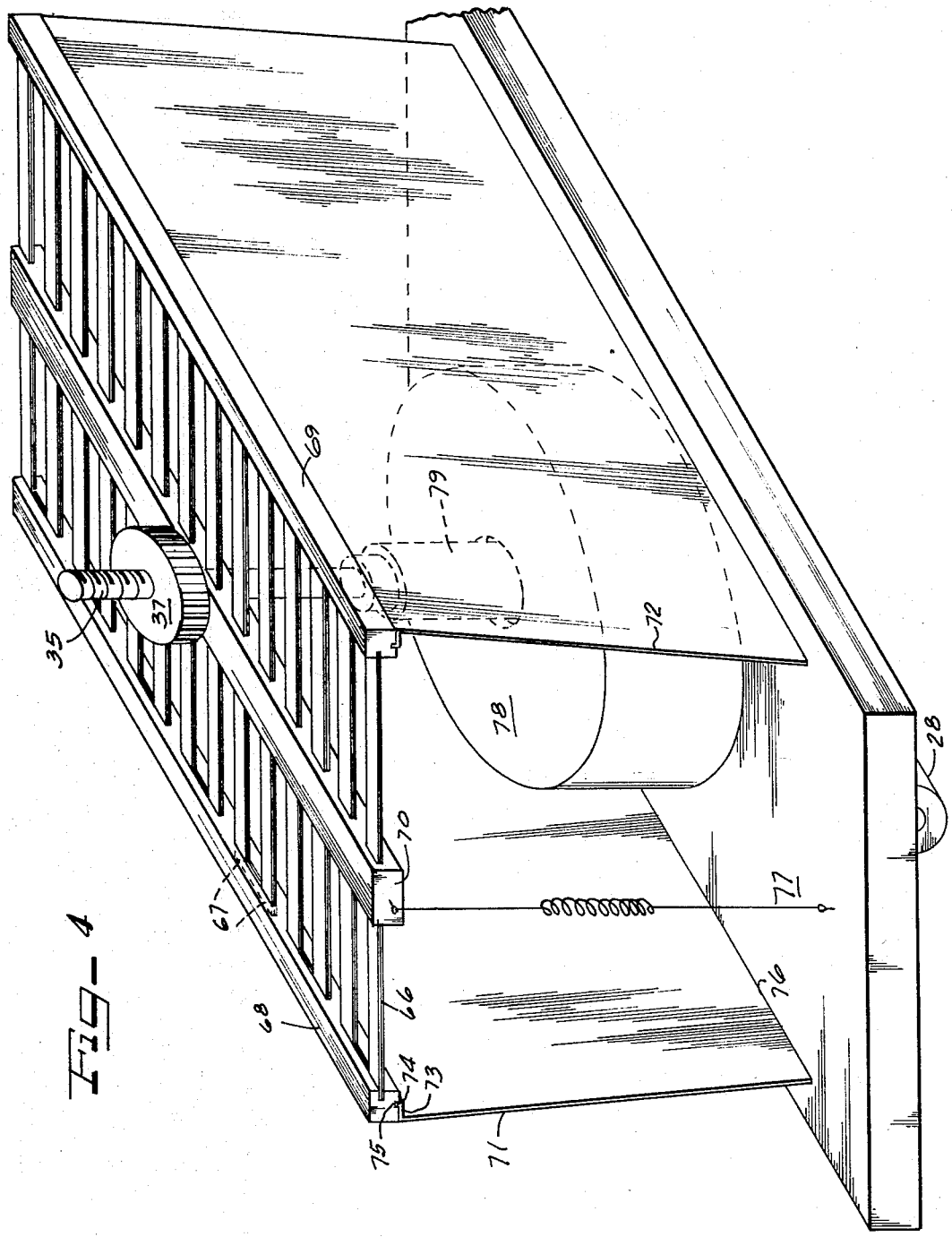

United States Patent Office 3,286,922
Patented Nov. 22, 1966

3,286,922
ELECTRO VACUUM TEMPERATURE CONTROL SYSTEM
Rudolph J. Franz, Arlington Heights, Ill., assignor to The Dole Valve Company, Morton Grove, Ill., a corporation of Illinois
Filed Apr. 26, 1965, Ser. No. 450,990
14 Claims. (Cl. 236—9)

This invention relates to a temperature control system for use in an automobile or similar vehicle and employing a novel sensor-transducer for registering temperature levels at critical points throughout the system and making temperature corrections accordingly while involving a minimum circuit complexity and invoking a minimum power consumption.

As is well known in the art, regulation of air temperature for a road vehicle is considerably more complex, involving more variables, than similar types of regulation found under the familiar circumstances associated with a permanent dwelling.

A primary consideration for any system intended to be adapted to a moving vehicle is the need for a provision capable of compensating for the variable rates of heat transfer to and from the passenger areas. First, the modern automobile with its wraparound windows and often convertible top presents an insurmountable insulation problem resulting in rapid heat losses. Furthermore, this heat loss problem is additionally aggravated by the fan-like effect due to the vehicle's movement through a temperature contrasting environment.

The importance of this poor insulation characteristic to a temperature regulation system lies in the fact that a sudden change in the outside temperature can quickly cool the passenger compartment before the system is able to respond with additional heat. It can be appreciated therefore that the adequacy of such a system depends upon its ability to anticipate outside temperature changes and make advance compensation accordingly.

Along with heat loss, the heat input is also a variable factor. For most vehicles, surplus heat from the engine's combustion process is the heat source for the passenger compartment. Experience indicates, however, that this heat source is far from steady.

For a liquid cooled engine the fluid temperature will range from the ambient temperature to 180° F. or above, while under the changing conditions of normal driving the fluctuation may be as much as 40° F. In order to maintain an even heat flow and thereby avoid the "hot blast" phenomenon, provision must be made to compensate for these variations in the available heat source.

Therefore it is a principal object of the present invention to provide a temperature control system for maintaining a substantially constant temperature level suitable for adaptation to a moving vehicle.

It is also an object of this invention to provide a temperature control system adaptable to a moving vehicle having a low initial cost and requiring a minimum power consumption.

It is a further object of this invention to provide a temperature control system with provisions capable of compensating for sudden outside temperature changes as well as for temperature fluctuations inherent in the heating system of a combustion engine.

Additional features, objects and advantages of this invention will be understood from the following description and the associated drawings in which an exemplification of the invention is shown.

On the drawings:
FIGURE 1 is a schematic diagram of the temperature control system according to the specification of this invention;

FIGURE 2 is a cross sectional view of the vacuum modulator as shown in the schematic of FIGURE 1; and
FIGURE 3 is an enlarged fragmentary isometric view of a portion of the temperature responsive element and associated structure.
FIGURE 4 shows an alternate assembly for maintaining the bimetal element in workable relationship with the vacuum modulator.

As shown on the drawings:
Referring to FIGURE 1, a vacuum modulator according to this invention is designated generally by the numeral 1 and comprises a framework 2 having a base plate 3 and vertical supporting columns 4 to 7.

A sensor transducer 8 is carried by supporting columns 4 to 7 and consists principally of a sinuous bimetal strip 9 reinforced by a pair of parallelly disposed arms 10 and 12. An actuating arm 11 is carried directly by the sinuous bi-metal strip 9 in a position parallel to and intermediate the arms 10 and 12. All three of the arms 10, 11 and 12 are formed of an electrical insulating material such as polyethylene.

The bimetal strip 9 includes parallel leg portions 15 and curved connecting portions 16 and 17 with the resulting configuration approximately resembling a continuing sinusoidal wave of large amplitude and relatively short period of repetition.

The end portions 16 and 17 are fixedly embedded within the arms 10 and 12 respectively, and the parallel leg portions 15 have points substantially equidistant from the end portions 16 and 17 fixedly embedded within the central arm 11. The arms 10 and 12 are permanently mounted on the supporting posts 4 to 7, while the central arm 11 is supported solely by the bimetal strip itself.

Located directly beneath the sensor transducer 8 is a vacuum modulator 1 having an inlet 20 preferably constructed of a noncorrosive metal such as copper. The inlet 20 has a tapered section 21 expanding into a pancake-like modulation chamber 22 (FIGURE 2) having side walls 23 and a lower wall 24. The side walls 23 have a flange 25 secured by a suitable means such as continuous welding for forming an air-tight union with the lower surface of the base plate 3. The chamber 22 symmetrically tapers to form an outlet 28, which like the inlet 20, is of a predetermined diameter for connection to a standard size fitting.

The base place 3 has a modulation opening 30 formed substantially coincident with the modulation chamber 22 and defining a circumferential wall 31. A resilient diaphram 32 is attached by a suitable means for providing an air-tight junction along the circumferential wall 31.

To operate the vacuum modulator in response to changes in the bimetal element an actuator rod 35 extends from the central arm 11 to the diaphragm 32 and is secured thereto by suitable means at a point 36. The actuator rod 35 is carried at the central arm 11 by an adjustable calibrated fixture 37 which enables the effective length of the rod 35 between the diaphragm 32 and the arm 11 to be varied manually. In this way the amount of deflection needed by the bimetal unit to close the vacuum chamber can be selectively determined.

The bimetal strip 9 is orientated so that the floating arm 11 will be moved inwardly of the assembly (i.e., downwardly as viewed in FIGURE 2) when subjected to a rise in temperature. Thus, a rise in temperature will cause the central arm 11 to depress the actuator rod 35 and the diaphragm 32. By depressing the diaphragm 32, the volume of the modulation chamber 22 is decreased and the passageway between the inlet 20 and the outlet 28 is, to that degree, restricted.

It is appreciated that to vary the vacuum available at the outlet 28 in response to deflections of the bimetal transducer means must be provided for venting the outlet after the closing of the diaphragm 32. Such a means is provided in FIGURE 1 in the form of a constant vent port 27 disposed in the outlet 28. It is understood that the port 27 must have a small venting capacity to assure that the vacuum available when the diaphragm 32 is fully opened is not significantly dissipated.

In connection with the use of a bimetal strip for this type of device one of the primary obstacles encountered rests in the difficulty of obtaining sufficient force from the thermal expansion to actuate the resilient diaphragm. The present invention has greatly increased the actuating force by providing a multileg bimetal strip in such a configuration that the expansive force of each leg cooperates cumulatively to aid in depressing the diaphragm.

Regarding the electrical network of FIGURE 1, the bimetal strip 9, disposed within the automobile's passenger compartment, is provided with a terminal 40 for connection through a line 41 to a thermistor 42 which is deployed within a heated air delivery duct 60 for sensing the temperature thereof.

The thermistor 42 is connected through a line segment 43 to a second thermistor 44 which is deployed for sensing the temperature of the air intake 61 of the system. For use in an automobile, the thermistor 44 might be disposed beneath the engine hood within the fresh air intake duct 61.

The thermistor 44 is in turn connected to a variable resistor 45 having a movable contact 46. Completing the circuit, a battery 48 has a negative pole 49 connected to the contact arm 46 of resistor 45 and a positive pole 50 connected to terminal 51 at the opposite end of the bimetal strip 9.

The resistor 45 is employed as a temperature selection device in that a constant bias current may be established in the bimetal element by setting the pointer 46 to a chosen value. This setting then determines the operating point of the system and may be calibrated, for example, in terms of degrees Fahrenheit. To assure that a relatively constant bias temperature is maintained, however, shunt resistors 38 and 39 are provided for the thermistors 42 and 44, respectively. In this way a continuous path is provided for the bias current as determined by the pointer 46 regardless of the value of the resistance associated with the thermistors 42 and 44.

Regarding the mechanical network of FIGURE 1, as indicated by the block diagram shown therein, a vacuum source 55 makes an air-tight junction with the inlet 20 of the vacuum modulator 1. For a combustion type engine, the vacuum source 55 can be acquired by tapping the intake manifold. This is the same vacuum source that has in the past been utilized to operate windshield wiper blades and distributor timing advance mechanism.

By way of example, a heat source 59 is provided which is arranged to have air heated as it is drawn therethrough from an air intake 61. The heated air is then delivered through a transfer duct 60 to the area 62 to be heated. The transfer duct 60 includes heat transfer control means 58 such as a damper located within the duct 60. Further, by way of example, a typical heat source might be an automobile heater and associated fan where the area 62 to be heated is the interior of the automobile.

The vacuum at the outlet 28 is modulated by the diaphragm 32 as indicated above. The resulting modulated signal is received by a vacuum responsive servo 57 such as a vacuum pump wherein the modulated signal is amplified to actuate the heat transfer control means 58.

An alternate form of the supporting structure for the bimetal element is shown in FIGURE 4. In general, the thermal unit comprises a bimetal element 66 having a rectangular waveshape as indicated by the broken lines at 67. It should be noted that this is in contrast to the example of FIGURE 3 where a sinuous waveform was employed.

The bimetal element 66 is supported in oppositely disposed arms 68 and 69 and has a deflection member 70 secured intermediate thereof as in the case of FIGURE 1. However, unlike the device of FIGURE 1, the entire thermal unit of FIGURE 4 is carried by flexible side walls 71 and 72. These flexible walls are provided to accommodate the distortions that accompanying the heating of the bimetal element. When the bimetal element is deformed the effective horizontal span of the arms 68 and 69 changes accordingly, and the flexible walls allow these arms to move inwardly or outwardly as the situations may require with a minimum loss of power from the system.

To offer adequate support to the thermal unit, as described, the side walls 71 and 72 are provided with a right angle bend 73 and a vertically extending lip 74 fitted within a complementarily disposed groove 75 within the arms 68 and 69. The walls 71 and 72 are then welded at a seam 76 to a base plate 77 of the vacuum modulator indicated by the modulator cover 78 and the actuation rod 79. If necessary, the thermal unit may be biased downwardly by a spring 80 connected from the actuating arm 70 to the base plate 77.

In operation, the heat transfer control means 58 is actuated through the system as described above by the thermal deflections of the bimetal strip 9. Deflection of the bimetal strip 9 is determined by three independent factors; first, the temperature in the heating duct containing the thermistor 42; second, the temperature in the fresh air duct as registered by thermistor 44; and third, the setting of the variable resistor 45. Resistor 45 acts as a temperature selector and in the embodiment chosen has a selection range from 60°–80° F. For a cool temperature, the contact 46 is moved to the left. The circuit resistance is to that degree diminished causing an increase in the current and thereby the heat level of the bimetal strip. The strip will then be deflected accordingly, depressing the diaphragm 32 and cutting off the vacuum supply to the remaining system.

Thermistors 42 and 44 perform automatically what the variable resistor does manually. The resistance of the circuit is reduced or increased as the temperature of the individually monitored regions rises or falls respectively. Lower circuit resistance, as in the case of the resistor, means more electrical heat for the bimetal strip. A decreased vacuum supply will in turn mean a reduced rate of heat transfer from the heat source 59.

The presence of the electrical network is supplementary to the thermal-mechanical activity of the in-car sensor as embodied in the novel bimetal strip 9. The circuitry as specified offers not only a temperature selection means but also a provision compensating for sudden outside or heating duct temperature changes. In this manner the preselected temperature level can be maintained by a steady rather than an abrupt or fluctuating warm air flow from the indicated heat source.

As for initial cost and power consumption, it should be emphasized that past attempts at similar regulation systems have necessitated more expensive means, such as the use of amplifier tubes, within the electrical circuit provided in order to achieve sufficient power for actuating an electrical-mechanical transducer. Through the novel features as indicated above such a requirement has herein been eliminated and the resulting initial cost and power consumption thereby reduced.

It will be understood that minor modifications may be suggested by those versed in the art, but I wish to embody within the scope of the patent warranted hereon all such modifications as come within the scope of my contribution to the art.

I claim as my invention:

1. A temperature control system comprising a continuous bimetal strip having the junction line of its two metals lying generally in a plane and having a plurality of bights and interconnecting segments forming a continuous wave-like element, a supporting frame having a pair of spaced arms, one of said arms being substantially rigidly secured to one alternate set of bights of said bimetal strip, the other of said arms being substantially rigidly secured to the other set of bights of said bimetal strip, an actuating arm secured to said bimetal strip at a plurality of points located intermediate said pair of supporting arms, said actuating arm being movable by said bimetal strip upon a temperature change of said bimetal strip, circuit means for passing an electric current through said bimetal strip, and means for manually adjusting the amount of current flow, whereby the degree of flexure of said bimetal strip is a function of the ambient temperature and of the heating effect of the current flowing therethrough.

2. A temperature control system comprising a continuous bimetal strip having the junction line of its two metals lying generally in a plane and having a plurality of bights and substantially parallel segments forming a wave-like element, a supporting frame having a pair of spaced arms, one of said arms being substantially rigidly secured to one alternate set of bights of said bimetal strip, the other of said arms being substantially rigidly secured to the other set of bights of said bimetal strip, an actuating arm secured to said bimetal strip at a plurality of points located intermediate said pair of supporting arms, said actuating arm being movable by said bimetal strip upon a temperature change of said bimetal strip, a thermistor and a variable resistor serially connected in said circuit means, said thermistor and said bimetal strip being arranged to be exposed to different environmental temperatures, whereby the degree of flexure of said bimetal strip is a function of the ambient temperature of the bimetal strip of the ambient temperature of the thermistor and of the amount of resistance manually introduced into said circuit means.

3. A temperature control system comprising a continuous bimetal strip having the junction line of its two metals lying generally in a plane having a plurality of bights and a plurality of transversely extending segments disposed in the form of a continuous wave, a supporting frame having a pair of spaced arms, one of said arms being substantially rigidly secured to one alternate set of bights of said bimetal strip, the other of said arms being substantially rigidly secured to the other set of bights of said bimetal strip, an actuating arm secured to said bimetal strip at a plurality of points located intermediate said pair of supporting arms, said actuating arm being movable by said bimetal strip upon a temperature change of said bimetal strip, a thermistor and a variable resistor serially connected in said circuit means, said thermistor having a resistor in shunt therewith, said thermistor and said bimetal strip being arranged to be exposed to different environmental temperatures, whereby the degree of flexure of said bimetal strip is a function of the ambient temperature of the bimetal strip of the ambient temperature of the thermistor and of the amount of resistance manually introduced into said circuit means.

4. A temperature control system comprising a continuous bimetal strip having the junction line of its two metals lying generally in a plane and having a plurality of bights and generally parallel segments, a supporting frame having a pair of spaced arms, one of said arms being substantially rigidly secured to one alternate set of bights of said bimetal strip, the other of said arms being substantially rigidly secured to the other set of bights of said bimetal strip, an actuating arm secured to said bimetal strip at a plurality of points located intermediate said pair of supporting arms, said actuating arm being movable by said bimetal strip upon a temperature change of said bimetal strip, a pair of thermistors and a variable resistor serially connected in said circuit means, each of said thermistors and said bimetal strip being arranged to be exposed to three different environmental temperatures, whereby the movement of said actuating arm is a function of all three environmental temperatures and of the setting of the variable resistor.

5. A temperature control system comprising a continuous bimetal strip having the junction line of its two metals lying generally in a plane having a plurality of bights and transversely connecting segments, a supporting frame having a pair of spaced arms, one of said arms being substantially rigidly secured to one alternate set of bights of said bimetal strip, the other of said arms being substantially rigidly secured to the other set of bights of said bimetal strip, an actuating arm secured to said bimetal strip at a plurality of points located intermediate said pair of supporting arms, said actuating arm being movable by said bimetal strip upon a temperature change of said bimetal strip, a pair of thermistors serially connected in said circuit means, each of said thermistors and said bimetal strip being arranged to be exposed to three different environmental temperatures, whereby the movement of said actuating arm is a function of all three environmental temperatures.

6. A temperature control system comprising a bimetal ribbon flatly disposed to have a repetitive waveshape including a plurality of bights in oppositely disposed sets, a supporting frame having a pair of parallel spaced arms, one of said arms being substantially rigidly secured to one alternate set of bights of said bimetal ribbon, the other of said arms being substantially rigidly secured to the other set of bights of said bimetal ribbon, an actuating arm disposed substantially intermediate and parallel to said pair of supporting arms and secured to said bimetal ribbon at each point of intersection therewith, said actuating arm being movable by said bimetal ribbon upon a temperature change therein, circuit means for passing an electric current through said bimetal ribbon, and means for manually adjusting the amount of current flow, whereby the degree of flexure of said bimetal ribbon is a function of the ambient temperature and of the heating effect of the current flowing therethrough.

7. A temperature control system comprising a bimetal ribbon flatly disposed to have a repetitive waveshape including a plurality of bights in oppositely disposed sets, a supporting frame having a pair of parallel spaced arms, one of said arms being substantially rigidly secured to one alternate set of bights of said bimetal ribbon, the other of said arms being substantially rigidly secured to the other set of bights of said bimetal ribbon, an actuating arm disposed substantially intermediate and parallel to said pair of supporting arms and secured to said bimetal ribbon at each point of intersection therewith, said actuating arm being movable by said bimetal ribbon upon a temperature change therein, a thermistor and a variable resistor serially connected in said circuit means, said thermistor and said bimetal ribbon being arranged to be exposed to different environmental temperatures, whereby the degree of flexure of said bimetal ribbon is a function of the ambient temperature of the bimetal ribbon of the ambient temperature of the thermistor and of the amount of resistance manually introduced into said circuit means.

8. A temperature control system comprising a bimetal ribbon flatly disposed to have a repetitive waveshape including a plurality of bights in oppositely disposed sets, a supporting frame having a pair of parallel spaced arms, one of said arms being substantially rigidly secured to one alternate set of bights of said bimetal ribbon, the other of said arms being substantially rigidly secured to the other set of bights of said bimetal ribbon, an actuating arm disposed substantially intermediate and parallel to said pair of supporting arms and secured to said bimetal ribbon at each point of intersection therewith, said actuating arm being movable by said bimetal ribbon upon a temperature change therein, a thermistor and a variable resistor serially connected in said circuit means, each of said thermistors and said bimetal ribbon being arranged to be exposed to three different environmental temperatures, whereby the movement of said actuating arm is a function of all three environmental temperatures and of the setting of the variable resistor.

9. A temperature control system comprising a bi-metal ribbon flatly disposed to have a repetitive waveshape including a plurality of bights in oppositely disposed sets, a supporting frame having a pair of parallel spaced arms, one of said arms being substantially rigidly secured to one alternate set of bights of said bimetal ribbon, the other of said arms being substantially rigidly secured to the other set of bights of said bimetal ribbon, an actuating arm disposed substantially intermediate and parallel to said pair of supporting arms and secured to said bimetal ribbon at each point of intersection therewith, said actuating arm being movable by said bimetal ribbon upon a temperature change therein, a pair of thermistors serially connected in said circuit means, each of said thermistors and said bimetal ribbon being arranged to be exposed to three different environmental temperatures, whereby the movement of said actiuatnig arm is a function of all three environmental temperatures.

10. A vacuum operated heater control comprising a vacuum responsive servo for regulating the amount of heat transferred from a heat source to an area to be heated, a conduit for connecting said vacuum responsive servo to a vacuum source, said conduit having a flexible wall portion arranged to be variably collapsed to reduce the cross-sectional area of a portion of said conduit, an electromechanical transducer connected to said flexible wall portion to collapse the same in varying degrees, said transducer including a bimetal element disposed in the area to be heated and responsive to the temperature of said area to move said flexible wall portion, circuit means connecting said bimetal element to a source of electric energy to cause an electric current to flow therethrough, thermistor means and a variable resistor connected in said circuit means to modify the amount of current flowing through said bimetal element, said thermistor means being disposed exterior of said area to be heated and said variable resistor being manually adjustable to modify the amount of current flowing through said bimetal element, the movement of said bimetal element being thus effected by the ambient temperature to which said bimetal element is subjected, and by the heating effect of the electric current flowing therethrough.

11. In a heating system having a vacuum responsive servo mechanism for controlling the amount of heat delivered to an area to be heated, a conduit arranged to connect said servo mechanism to a vacuum source, means for variably restricting said conduit, an electromechanical transducer connected to said restricting means to actuate the same, said transducer including a bimetal element arranged to be disposed in said area to be heated, said restricting means being movable to a more restrictive position upon a rise in temperature of said bimetal element and to a less restrictive position upon a decrease in temperature, thermistor means arranged to be disposed exterior of said area to be heated, a manually adjustable variable resistor, and a source of electric energy connected to space points on said bimetal element serially through said resistor and said thermistor means, whereby the position of said restricting means, as determined by the position of said bimetal element, is determined by the combined effect of its own ambient temperature, by the ambient temperature of said thermistor means and by the manual adjustment of said resistor.

12. In a heating system having a vacuum responsive servo mechanism for controlling the amount of heat delivered to an area to be heated, a conduit arranged to connect said servo mechanism to a vacuum source, means for variably restricting said conduit, an electromechanical transducer connected to said restricting means to actuate the same, said transducer including a bimetal element arranged to be disposed in said area to be heated, said restricting means being movable to a more restrictive position upon a rise in temperature of said bimetal element and to a less restrictive position upon a decrease in temperature, thermistor means arranged to be disposed exterior of said area to be heated, and a source of electric energy connected to space points on said bimetal element serially through said thermistor means, whereby the position of said restricting means, as determined by the position of said bimetal element, is determined by the combined effect of its own ambient temperature and by the ambient temperature of said thermistor means.

13. In a heating system for heating a predetermined area including a heat source, an air intake for delivering air to said heat source, means for transferring air heated by said heat source to said area including a transfer duct and means for regulating the rate of flow of heated air therethrough, a vacuum responsive servo mechanism for operating said regulating means, a conduit arranged to connect said servo mechanism to a vacuum source, means for variably restricting said conduit, an electromechanical transducer connected to said restricting means to actuate the same, said transducer including a bimetal element arranged to be disposed in said area to be heated, said restricting means being movable to a more restrictive position upon a rise in temperature of said bimetal element and to a less restrictive position upon a decrease in temperature, a thermistor disposed in said duct, a manually adjustable variable resistor, and a source of electric energy connected to space points on said bimetal element serially through said resistor and said thermistor, whereby the position of said restricting means, as determined by the position of said bimetal element, is determined by the combined effect of its own ambient temperature, by the ambient temperature of said thermistor and by the manual adjustment of said resistor.

14. In a heating system for heating a predetermined area including a heat source, an air intake for delivering air to said heat source, means for transferring air heated by said heat source to said area including a transfer duct and means for regulating the rate of flow of heated air therethrough, a vacuum responsive servo mechanism for operating said regulating means, a conduit arranged to connect said servo mechanism to a vacuum source, means for variably restricting said conduit, an electromechanical transducer connected to said restricting means to actuate the same, said transducer including a bimetal element arranged to be disposed in said area to be heated, said restricting means being movable to a more restrictive position upon a rise in temperature of said bimetal element and to a less restrictive position upon a decrease in temperature, a first thermistor disposed in said duct, a second thermistor disposed to sense the temperature of air drawn into said air intake, a source of electric energy connected to space points on said bimetal element serially through said first and second thermistors, and manually actuated means for modifying the extent of movement of said bimetal element, whereby the position of said restricting means, as determined by the position of said bimetal element is determined by the combined effect of its own ambient temperature, by the temperature of the air in said duct, by the temperature of the air being drawn into said air intake and by the modifying means.

References Cited by the Examiner
UNITED STATES PATENTS 2,870,965    2/1959    Kreuter _____ 236—68
3,202,786    8/1965    Bodge _____ 200—113.8

EDWARD J. MICHAEL, *Primary Examiner.*